(12) United States Patent
Han et al.

(10) Patent No.: US 9,079,755 B2
(45) Date of Patent: Jul. 14, 2015

(54) ENERGY RECLAIMING SYSTEM FOR ELECTRIC FORKLIFT TRUCK

(75) Inventors: Dong Ho Han, Seoul (KR); Dal Sik Jang, Seoul (KR)

(73) Assignee: Doosan Corporation, Seoul (KR)

( * ) Notice: Subject to any disclaimer, the term of this patent is extended or adjusted under 35 U.S.C. 154(b) by 498 days.

(21) Appl. No.: 13/522,174

(22) PCT Filed: May 19, 2011

(86) PCT No.: PCT/KR2011/003697
§ 371 (c)(1),
(2), (4) Date: Jul. 13, 2012

(87) PCT Pub. No.: WO2011/145891
PCT Pub. Date: Nov. 24, 2011

(65) Prior Publication Data
US 2013/0145751 A1 Jun. 13, 2013

(30) Foreign Application Priority Data
May 20, 2010 (KR) .......................... 10-2010-0047188

(51) Int. Cl.
*B66F 9/22* (2006.01)
*B60L 1/00* (2006.01)

(52) U.S. Cl.
CPC ... *B66F 9/22* (2013.01); *B60L 1/20* (2013.01); *B60L 2200/42* (2013.01)

(58) Field of Classification Search
CPC ........... F15B 2211/88; B66F 9/22; B60L 1/20
USPC .................... 60/414, 417, 420, 422, 460, 464
See application file for complete search history.

(56) References Cited

U.S. PATENT DOCUMENTS 5,626,070 A * 5/1997 Sorbel .............................. 91/521
5,649,422 A * 7/1997 Baginski et al. ................ 60/431

(Continued)

FOREIGN PATENT DOCUMENTS

DE 10010670 A1 9/2001
DE 102008048057 A1 3/2010
(Continued)

OTHER PUBLICATIONS

Search Report dated Feb. 6, 2012 written in Korean for International Application No. PCT/KR2011/003697, filed May 19, 2011, 3 pages.

(Continued)

*Primary Examiner* — Dwayne J White
*Assistant Examiner* — Matthew Wiblin
(74) *Attorney, Agent, or Firm* — John D. Veldhuis-Kroeze; Westman, Champlin & Koehler, P.A.

(57) ABSTRACT

The present disclosure relates to an energy reclaiming system for an electric forklift truck. The energy reclaiming system includes an electronic device operated by a motor when a working machine is raised and operated by a generator when the working machine is lowered, a hydraulic pump/motor connected to the electronic device and configured to perform two functions of a hydraulic pump and a hydraulic motor, a main control valve unit including a lift cylinder operating unit connected to the hydraulic pump/motor and configured to operate a lift cylinder and a secondary consumer operating unit connected to the hydraulic pump/motor and configured to operate a secondary consumer, and a control lever including a control valve configured to control the lift cylinder or the secondary consumer through the lift cylinder operating unit and the secondary consumer operating unit of the main control valve unit, respectively. The energy reclaiming system includes: a working fluid return line provided with a flow amount limiting valve configured to interrupt a flow of a return flow amount generated by the lift cylinder when the working machine (or fork carriage) is lowered; and an energy reclaiming unit installed in the working fluid return line and configured to, if a return flow amount generated when the working machine is lowered is smaller than a flow amount consumed by the secondary consumer, reclaim the return flow amount to an oil tank, and, if the return flow amount generated when the working machine is lowered is larger than the flow amount consumed by the secondary consumer, guide the return flow amount to the hydraulic pump/motor.

4 Claims, 5 Drawing Sheets

(56) References Cited

U.S. PATENT DOCUMENTS

| | | | |
|---|---|---|---|
| 6,125,970 A | 10/2000 | Takeuchi et al. | |
| 7,043,906 B2 * | 5/2006 | Suzuki et al. | 60/422 |
| 8,220,256 B2 * | 7/2012 | Mueller | 60/414 |
| 2008/0128214 A1 | 6/2008 | Tahashi et al. | |
| 2008/0250783 A1 * | 10/2008 | Griswold | 60/422 |
| 2013/0283776 A1 * | 10/2013 | He et al. | 60/459 |

FOREIGN PATENT DOCUMENTS

| | | |
|---|---|---|
| EP | 1308415 A1 | 5/2003 |
| GB | 2385844 A | 9/2003 |
| JP | 02-231398 | 9/1990 |
| JP | 2009-256094 A | 11/2009 |

OTHER PUBLICATIONS

European Search Report dated Aug. 13, 2014 for corresponding European Application No. 11783773, 7 pages.

* cited by examiner

ENERGY RECLAIMING SYSTEM FOR ELECTRIC FORKLIFT TRUCK

This Application is a Section 371 National Stage Application of International Application No. PCT/KR2011/003697, filed May 19, 2011 and published, not in English, as WO2011/145891 on Nov. 24, 2011.

FIELD OF THE DISCLOSURE

The present disclosure relates to an energy reclaiming system for an electric forklift truck, and more particularly, to an energy reclaiming system for an electric forklift truck which, if a return flow amount generated when a working machine (or fork carriage) is lowered is smaller than a flow amount consumed by a secondary consumer, reclaims the return flow amount to an oil tank as it is, and if the return flow amount generated when the working machine is lowered is larger than the flow amount consumed by the secondary consumer, reclaims energy of the return flow amount.

BACKGROUND OF THE DISCLOSURE

In general, forklift trucks are used to raise or lower freight or carry freight to a desired location within a restricted space, and are largely classified into engine forklift trucks and electric forklift trucks according to power sources. Electric forklift trucks use electric power supplied from a battery as a power source, and are mainly used in an interior work as they emit no exhaust gas and generate little noise as compared with engine forklift trucks.

An electric forklift truck is manufactured by removing an engine and a fuel tank from an engine forklift truck and installing a drive motor, a hydraulic motor, and a battery, and the drive motor and the hydraulic motor are driven by the battery so that the electric forklift truck can be steered and driven or a working machine can be driven by a hydraulic oil discharged from a hydraulic pump driven by the corresponding motor.

Figure 1:
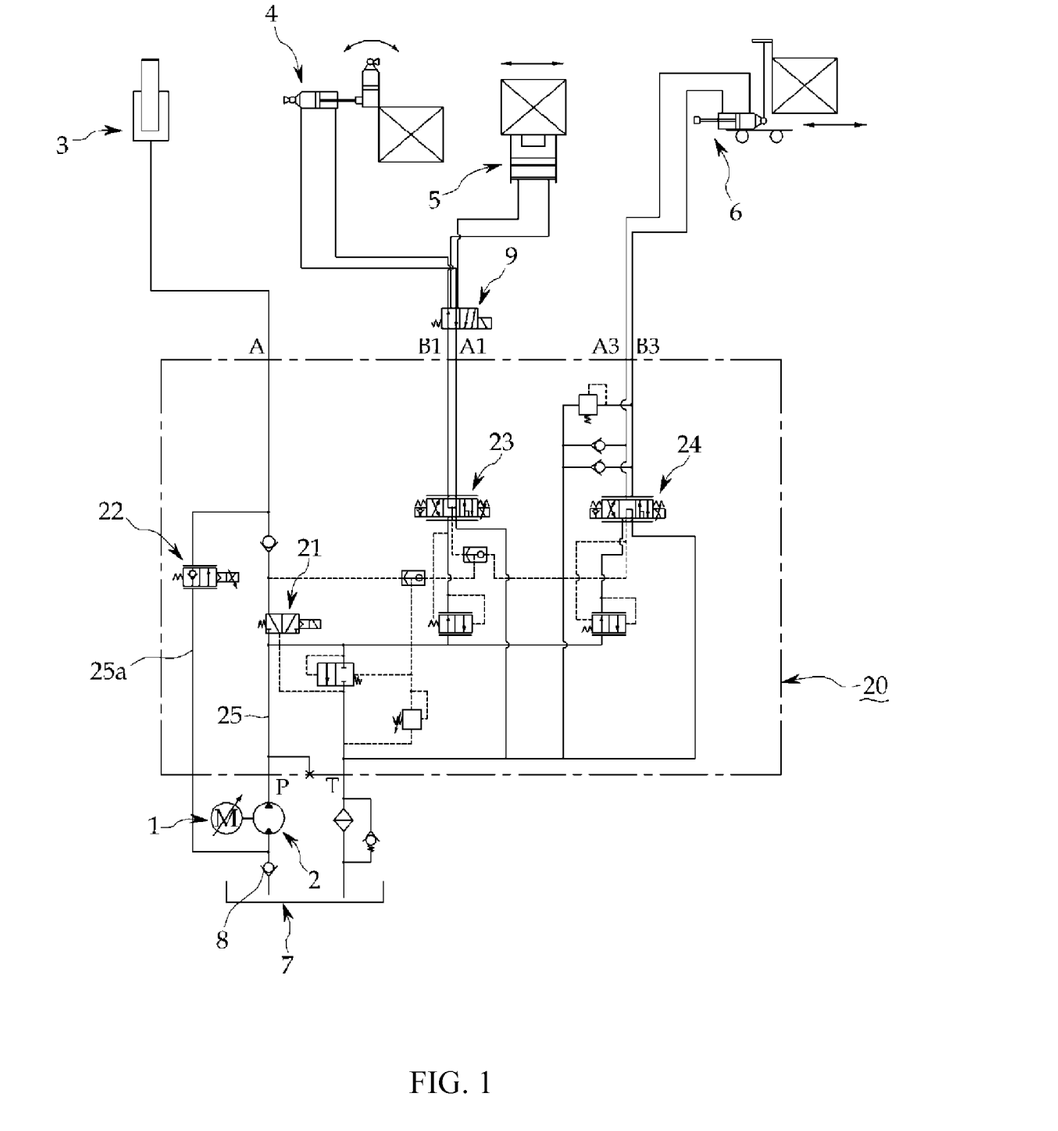
FIG. 1 is a hydraulic circuit diagram of an energy reclaiming system for an electric forklift truck according to the related art.

FIG. 1 is a hydraulic circuit diagram of an energy reclaiming system for an electric forklift truck according to the related art.

As illustrated in FIG. 1, the electric forklift truck according to the related art includes an electronic device 1, a hydraulic pump/motor 2, a main control valve unit 20, a lift cylinder 3, a tilt cylinder 4, a side shift cylinder 5 and a reach cylinder 6.

Here, the electronic device 1 is operated by a motor when the working machine is raised and is operated by a power generator when the working machine is lowered. The hydraulic pump/motor 2 is adapted to selectively or simultaneously perform two functions of a hydraulic pump and a hydraulic motor, and is operated by power from the electronic device 1 and selectively supplies a working fluid from an oil tank 7 to the lift cylinder 3, the tilt cylinder 4, the side shift cylinder 5, and the reach cylinder 6 through the main control valve unit 20.

The main control valve unit 20 includes a lift valve 21 configured to control a flow of a working fluid supplied from the hydraulic pump/motor 2 to the lift cylinder 3 and installed in a working fluid supply line 25, and a flow amount limiting valve 22 configured to control a flow of the working fluid discharged from the lift cylinder 3 to an inlet port of the hydraulic pump/motor 2 and installed in a working fluid return line 25a. A check valve 8 is installed in the working fluid supply line 25 connecting the oil tank 7 and the hydraulic pump/motor 2, and the working fluid return line 25a is connected to the working fluid supply line 25 between the hydraulic pump/motor 2 and the check valve 8.

The main control valve unit 20 includes a first control valve 23 configured to control a flow of the working fluid supplied from the hydraulic pump/motor 2 to the tilt cylinder 4 and the side shift cylinder 5, respectively, and to control a flow of the working fluid returning from the tilt cylinder 4 and the side shift cylinder 5 to the oil tank 7, respectively. The main control valve unit 20 further includes a second control valve 24 configured to control a flow of the working fluid supplied from the hydraulic pump/motor 2 to the reach cylinder 6 and to control a flow of the working fluid returning from the reach cylinder 6 to the oil tank 7.

A direction control valve 9 configured to control a flow of the working fluid supplied from the hydraulic pump/motor 2 to the tilt cylinder 4 and the side shift cylinder 5 through the first control valve 23, respectively, and to control a flow of the working fluid returning from the tilt cylinder 4 or the side shift cylinder 5 to the oil tank 7 through the first control valve 23 is installed in the working fluid supply line 25 connecting the tilt cylinder 4 and the side shift cylinder 5, and the main control valve unit 20.

Meanwhile, the lift cylinder 3 is raised by the working fluid supplied through the hydraulic pump/motor 2 by opening the lift valve 21 of the main control valve unit 20 to operate the working machine (or fork carriage). When the lift cylinder 3 is lowered by opening the flow amount limiting valve 22 of the main control valve unit 20, mechanical energy of the working fluid discharged from the lift cylinder 3 operates the electronic device 1 through the hydraulic pump/motor 2 to be converted into electric energy while charging the battery (not shown). That is, the working fluid return line 25a is connected to the working fluid supply line 25 between the hydraulic pump/motor 2 and the check valve 8 so that the working fluid discharged from the lift cylinder 3 through the flow amount limiting valve 22 is not discharged to the oil tank 7 but is guided to the hydraulic pump/motor 2 to reclaim the lowering energy of the working machine (or fork carriage) as described above. The flow amount generated when the lift cylinder 3 is lowered to lower the working machine (or fork carriage) is used as a working flow amount when the working machine or the secondary consumer (for example, the tilt cylinder 4, the side shift cylinder 5, or the reach cylinder 6) is raised.

However, in the energy reclaiming system for an electric forklift truck according to the related art, it is necessary to limit a speed of the electronic device 1 to prevent cavitations generated when the suctioned flow amount is insufficient as compared with the flow amount discharged from the hydraulic pump/motor 2, in the case where the return flow amount generated when the working machine (or fork carriage) is lowered is smaller than the flow amount consumed by a secondary consumer (the tilt cylinder 4, the side shift cylinder 5 or the reach cylinder 6), which lowers energy reclaiming efficiency.

In addition, in the energy reclaiming system for an electric forklift truck according to the related art, when the working machine (fork carriage) is lowered and the secondary consumer is operated at the same time, it is inevitably necessary to limit the speed of the electronic device 1 to prevent cavitations generated when the suctioned flow amount is insufficient as compared with the flow amount discharged from the hydraulic pump/motor 2, which lowers the speed of the working machine of the secondary consumer.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure is contrived to solve the above-mentioned problems, and the object of the present disclosure is to provide an energy reclaiming system for an electric forklift truck which, if a return flow amount generated when a working machine (or fork carriage) is lowered is smaller than a flow amount consumed by a secondary consumer, reclaims the return flow amount to an oil tank as it is, and if the return flow amount generated when the working machine is lowered is larger than the flow amount consumed by the secondary consumer, supplies the return flow amount to a hydraulic pump/motor so that the return flow amount can be used to operate the secondary consumer or converts mechanical energy of the return flow amount into electric energy so that the converted electric energy can be reclaimed to a battery.

In order to solve the object, there is provided an energy reclaiming system for an electric forklift truck, including an electronic device 1 operated by a motor when a working machine is raised and operated by a generator when the working machine is lowered, a hydraulic pump/motor 2 connected to the electronic device 1 and configured to perform two functions of a hydraulic pump and a hydraulic motor, a main control valve unit 20a including a lift cylinder operating unit 30 connected to the hydraulic pump/motor 2 and configured to operate a lift cylinder 3 and a secondary consumer operating unit 41 connected to the hydraulic pump/motor 2 and configured to operate a secondary consumer 40, and a control lever 32 including a control valve 31 configured to control the lift cylinder 3 or the secondary consumer 40 through the lift cylinder operating unit 30 and the secondary consumer operating unit 41 of the main control valve unit 20a, respectively, the energy reclaiming system including: a working fluid return line 25a provided with a flow amount limiting valve 22 configured to interrupt a flow of a return flow amount generated by the lift cylinder 3 when the working machine (or fork carriage) is lowered; and an energy reclaiming unit 50 installed in the working fluid return line 25a and configured to, if a return flow amount generated when the working machine is lowered is smaller than a flow amount consumed by the secondary consumer 40, reclaim the return flow amount to an oil tank 7, and, if the return flow amount generated when the working machine is lowered is larger than the flow amount consumed by the secondary consumer 40, guide the return flow amount to the hydraulic pump/motor 2.

The present disclosure further provides the following detailed exemplary embodiments.

The energy reclaiming unit 50 may include a hydraulically controlled two position valve 51 installed in the working fluid return line 25a and having a first position for, if a return pilot pressure when the working machine is lowered is smaller than a supply pilot pressure during an operation of the secondary consumer 40, opening a passage of the working fluid generated by the lift cylinder 3 to the oil tank 7, and a second position for, if the return pilot pressure when the working machine is lowered is larger than the supply pilot pressure during an operation of the secondary consumer 40, opening the passage of the working fluid generated by the lift cylinder 3 to the hydraulic pump/motor 2.

The energy reclaiming unit 50 may include an electronically controlled two position valve 51a installed in the working fluid return line 25a and having a first position for opening a passage of the working fluid generated by the lift cylinder 3 to the oil tank 7 and a second position for opening the passage of the working fluid generated by the lift cylinder 3 to the hydraulic pump/motor 2, a signal transmitter installed adjacent to a lower portion of the control lever 32 and configured to generate a preset operation signal according to a magnitude of an operational displacement of a control lever 32 having a control valve 31 connected to the lift cylinder operating unit 30, and a controller 52 electrically connected to the two position valve 51a and the signal transmitter and configured to control the two position valve 51a such that the two position valve 51a is switched to one of the first position and the second position according to an operation signal received from the transmitter.

The energy reclaiming system may further include a check valve 8 installed in a downstream working fluid line of the hydraulic pump/motor 2 such that the return flow amount passing through one of the two positions of the two position valve 51 or 51a is guided to the hydraulic pump/motor 2 without being leaked to the oil tank 7.

The working fluid return line 25a may include an upstream working fluid return line 55 provided with the flow amount limiting valve 22, a first downstream working fluid return line 55a for guiding the return flow amount generated by the lift cylinder 3 when the working machine is lowered from the two position valve 51 or 51a to the oil tank 7, and a second downstream working fluid return line 55b for guiding the return flow amount generated by the lift cylinder 3 when the working machine is lowered from the two position valve 51 or 51a to the hydraulic pump/motor 2.

The energy reclaiming system may further include a choke valve 56 installed in the first downstream working fluid return line 55a to retard a lowering speed of the return flow amount returning from the two position valve 51 or 51a to the oil tan 7; and a check valve 57 one end of which is connected to the first downstream working fluid return line 55a upstream of the choke valve 56 and an opposite end of which is connected to the first downstream working fluid return line 55a downstream of the choke valve 56, the check valve 57 allowing a flow of the working fluid from the oil tank to an upstream side of the choke valve 56.

The present disclosure provides an energy reclaiming unit to a working fluid return line so that, if a return flow amount generated when a working machine is lowered is smaller than a flow amount consumed by a secondary consumer, the return flow amount can be reclaimed to an oil tank, which prevents cavitations generated by a hydraulic pump/motor during an energy reclaiming process according to the related art or a dull operation of a secondary consumer.

In addition, the present disclosure provides an energy reclaiming unit to a working fluid return line so that, if a return flow amount generated when a working machine is lowered is larger than a flow amount consumed by a secondary consumer, the return flow amount is directly guided to a hydraulic pump/motor to used to operate the secondary consumer or to operate the hydraulic pump/motor, converting mechanical energy of the return flow amount to electric energy so that the converted electric energy can be reclaimed to a battery.

DETAILED DESCRIPTION

Hereinafter, an exemplary embodiment of an energy reclaiming system for an electric forklift truck according to the present disclosure will be described with reference to FIGS. 2-5.

Figure 2:
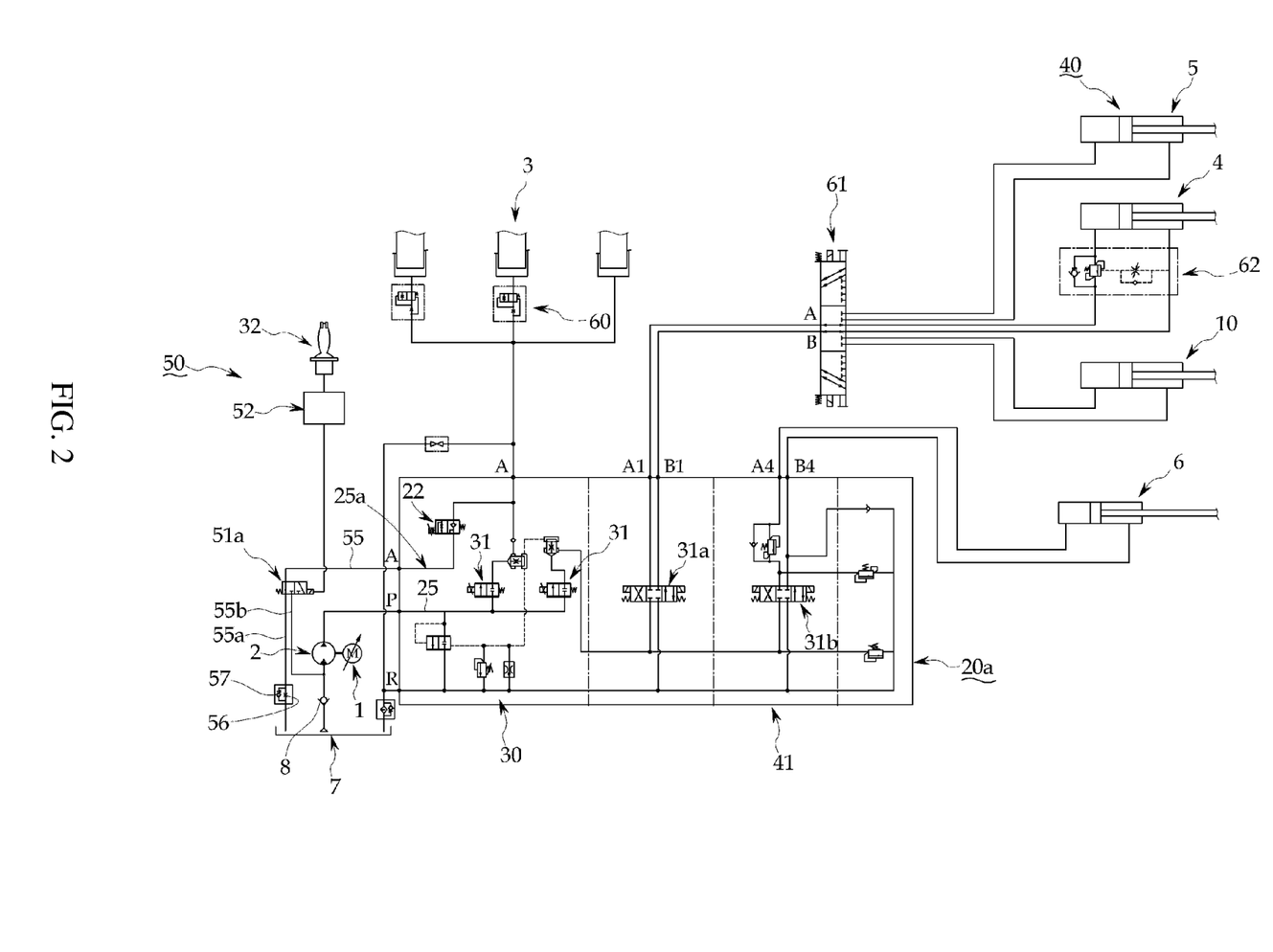
FIGS. 2 and 4 are hydraulic circuit diagrams each illustrating an energy reclaiming system for an electric forklift truck according to the present disclosure in a state where a two position valve is converted into a first position for opening a working fluid return line to an oil tank.
Figure 3:
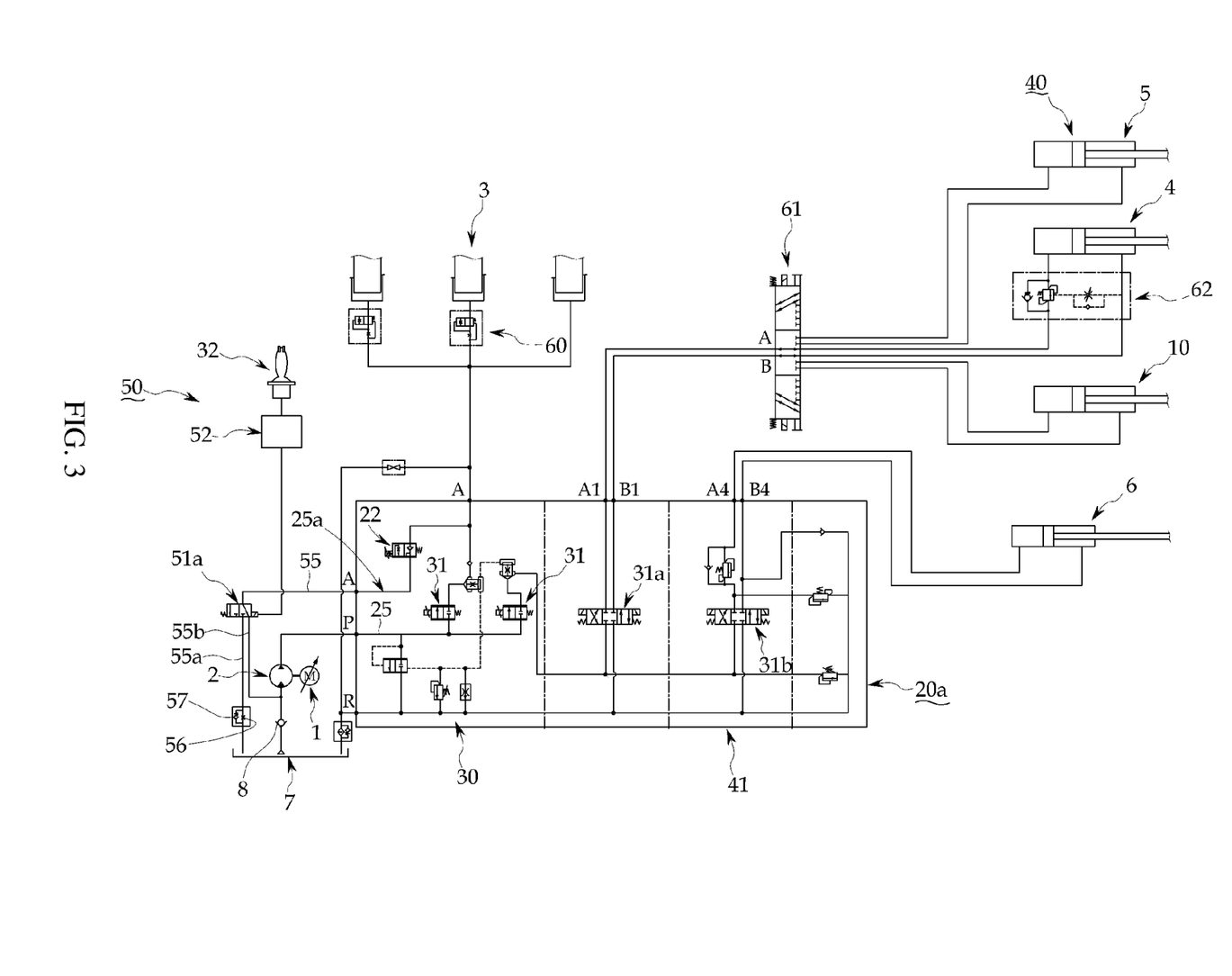
FIGS. 3 and 5 are hydraulic circuit diagrams each illustrating the energy reclaiming system for an electric forklift truck according to the present disclosure in a state where the two position valve is converted into a second position for opening the working fluid return line to a hydraulic pump/motor.
Figure 4:
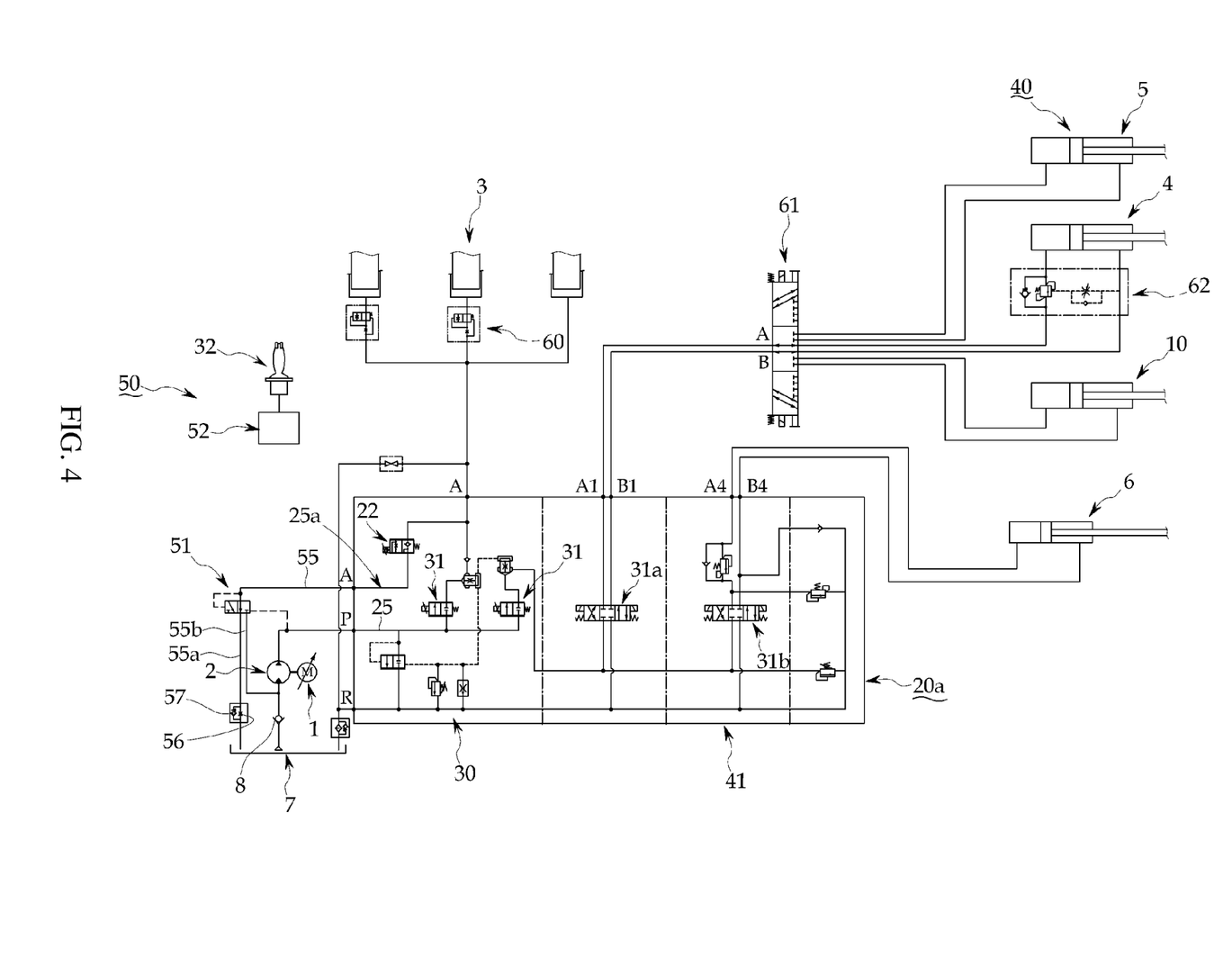
Figure 5:
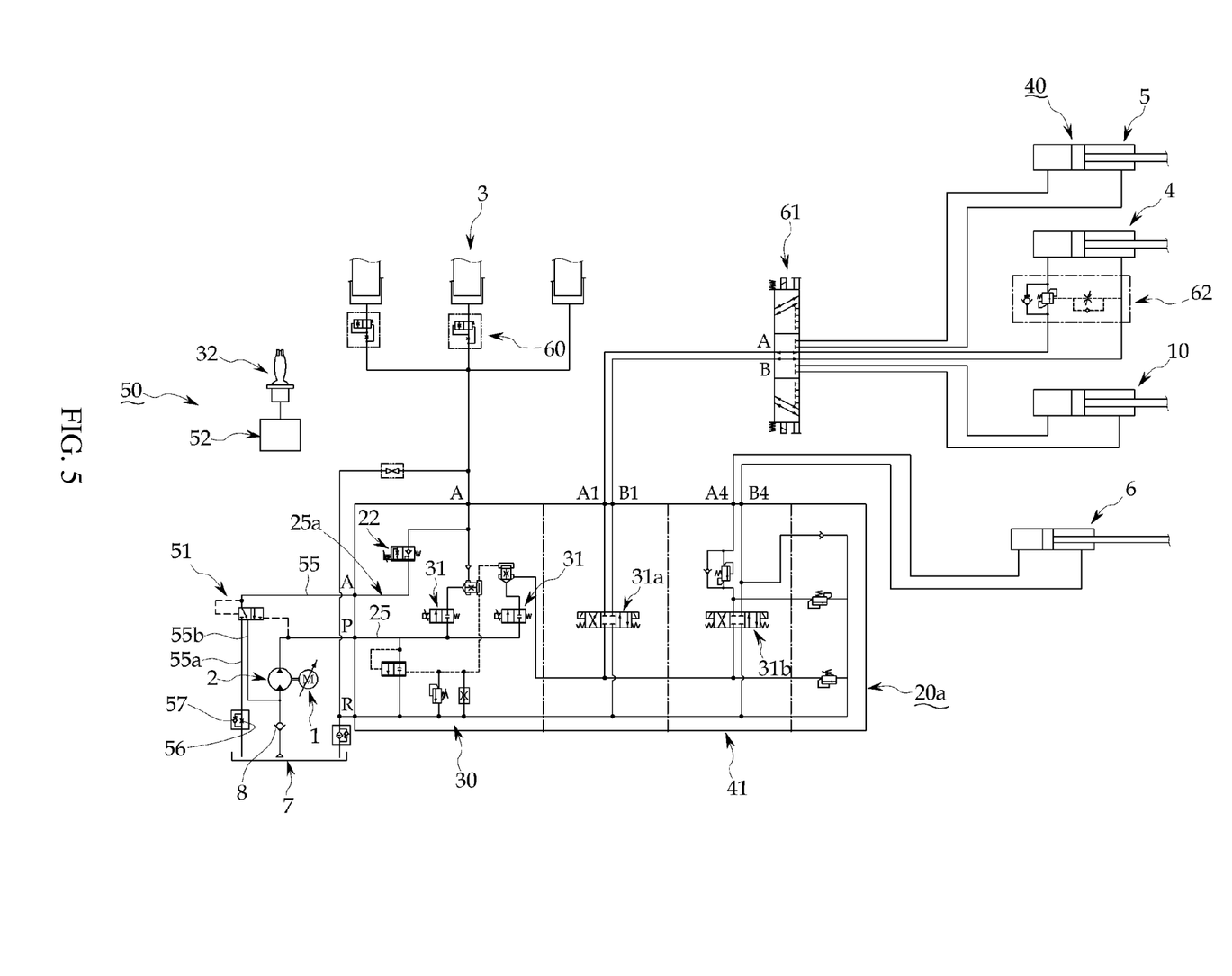

FIGS. 2 and 4 are hydraulic circuit diagrams illustrating an energy reclaiming system for an electric forklift truck according to the present disclosure in a state where a two position valve is converted into a first position for opening a working fluid return line to an oil tank. FIGS. 3 and 5 are hydraulic circuit diagrams illustrating the energy reclaiming system for an electric forklift truck according to the present disclosure in a state where the two position valve is converted into a second position for opening the working fluid return line to a hydraulic pump/motor.

The energy reclaiming system for an electric forklift truck according to the present disclosure includes an electronic device 1, a hydraulic pump/motor 2 connected to the electronic device 1 and configured to perform two functions of a hydraulic pump and a hydraulic motor, a main control valve unit 20a including a lift cylinder operating unit 30 connected to the hydraulic pump/motor 2 and configured to operate a lift cylinder 3 and a secondary consumer operating unit 41 connected to the hydraulic pump 2 and configured to operate a secondary consumer 40, and a control lever 32 including a control valve 31 configured to control the lift cylinder 3 or the secondary consumer 40 through the lift cylinder operating unit 30 and the secondary consumer operating unit 41 of the main control valve unit 20a, respectively.

The energy reclaiming system includes a working fluid return line 25a provided with a flow amount limiting valve 22 configured to interrupt a flow of a return flow amount generated by the lift cylinder 3 when a working machine (or fork carriage) is lowered. An energy reclaiming unit 50 configured to, if a return flow amount generated when the working machine is lowered is smaller than a flow amount consumed by the secondary consumer 40, reclaim the return flow amount to an oil tank 7, and, if the return flow amount generated when the working machine is lowered is larger than the flow amount consumed by the secondary consumer 40, guide the return flow amount to the hydraulic pump/motor 2 is installed in the working fluid return line 25a. Reference numeral 25 of the drawings which is not described denotes a working fluid supply line.

In the energy reclaiming system according to the present disclosure which is configured as described above, if a flow amount of the working fluid returning from the lift cylinder 3 when the working machine (or fork carriage) is lowered is smaller than a flow amount consumed by the secondary consumer 40 (for example, a tilt cylinder 4, a side shift cylinder 5, a reach cylinder 6 or an auxiliary cylinder 10), the return flow amount may be reclaimed to the oil tank 7 as it is through the energy reclaiming unit 50. In the energy reclaiming system, if the return flow amount generated when the working machine is lowered is larger than the flow amount consumed by the secondary consumer 40, the return flow amount is supplied to the hydraulic pump/motor 2 through the energy reclaiming unit 50 to be used to operate the secondary consumer 40 or mechanical energy of the return flow amount is converted into electric energy so that the converted electric energy can be reclaimed to a battery (not shown).

The energy reclaiming system for an electric forklift truck according to the present disclosure may be realized by further defining the above-described basic configuration with the following detailed exemplary embodiments.

As an exemplary embodiment, the energy reclaiming unit 50 may include a hydraulically controlled two position valve 51 installed in the working fluid return line 25a and configured to have a first position for, if a return pilot pressure when the working machine is lowered is smaller than a supply pilot pressure during an operation of the secondary consumer 40, opening a passage of the working fluid generated by the lift cylinder 3 to the oil tank 7, and a second position for, if the return pilot pressure when the working machine is lowered is larger than the supply pilot pressure during an operation of the secondary consumer 40, opening the passage of the working fluid generated by the lift cylinder 3 to the hydraulic pump/motor 2.

As another exemplary embodiment, the energy reclaiming unit 50 may largely include an electronically controlled two position valve 51a, a signal transmitter (not shown) and a controller 52. Here, the two position valve 51a is installed in the working fluid return line 25a and has a first position for opening a passage of the working fluid generated by the lift cylinder 3 to the oil tank 7 and a second position for opening the passage of the working fluid generated by the lift cylinder 3 to the hydraulic pump/motor 2, The signal transmitter (not shown) is installed adjacent to a lower portion of the control lever 32 and generates a preset operation signal according to a magnitude of an operational displacement of a control lever 32 having a control valve 31 connected to the lift cylinder operating unit 30. The signal transmitter (not shown) receives an operation signal generated according to an electronic signal, for example, a change in a pilot flow amount, a voltage or a current varied depending on a magnitude of an operational displacement of the control lever 32. The controller 52 is electrically connected to the two position valve 51a and the signal transmitter and controls the two position valve 51a such that the two position valve 51a is switched to one of the first position and the second position according to an operation signal received from the transmitter. Meanwhile, the two position valves illustrated in FIGS. 2 and 3 are denoted by a hydraulic symbol of an electrically controlled two position valve 51a (or solenoid type two position valve) of the two types of valves for convenience sake.

As one exemplary embodiment, a check valve 8 may be further installed in a downstream working fluid line of the hydraulic pump/motor 2 such that the return flow amount passing through one of the two positions of the two position valve 51 or 51a is guided to the hydraulic pump/motor 2 without being leaked to the oil tank 7. The check valve in the working fluid line is configured to allow the return flow amount generated by the lift cylinder 3 to be interrupted by the check valve 8 and be guided only to the hydraulic pump/motor 2.

As an exemplary embodiment, the working fluid return line 25a includes an upstream working fluid return line 55, a first downstream working fluid return line 55a and a second downstream working fluid return line 55b. Here, the upstream working fluid return line 55 is provided with the flow amount limiting valve 22. The first downstream working fluid return line 55a guides the return flow amount generated by the lift cylinder 3 when the working machine is lowered from the two position valve 51 or 51a to the oil tank 7. The second downstream working fluid return line 55b guides the return flow amount generated by the lift cylinder 3 when the working machine is lowered from the two position valve 51 or 51a to the hydraulic pump/motor 2.

As described above, the energy reclaiming unit 50 may be configured such that the return flow amount generated by the lift cylinder 3 is interrupted by the check valve 8 to be guided to the hydraulic pump/motor 2, or although not illustrated, a downstream end of the second downstream working fluid return line 55b is directly connected to the hydraulic pump/motor 2 such that the return flow amount is guided to the hydraulic pump/motor 2 without the check valve 8.

As an exemplary embodiment, the energy reclaiming unit 50 may further include a choke valve 56 and a check valve 57. Here, the choke valve 56 is installed in the first downstream working fluid return line 55a and retards a lowering speed of the return flow amount returning from the two position valve 51 or 51a to the oil tank 7. One end of the check valve 57 is connected to the first downstream working fluid return line 55a upstream of the choke valve 56 and an opposite end thereof is connected to the first downstream working fluid return line 55a downstream of the choke valve 56, and the check valve 57 allows a flow of the working fluid from the oil tank 7 to an upstream side of the choke valve 56.

An abrupt elevation preventing circuit 60 for preventing an abrupt elevation of the lift cylinder 3 is preferably installed in the working fluid line connecting the lift cylinder 3 and the hydraulic pump/motor 2. A direction control valve 61 for selectively controlling the secondary consumer 40, for example, a tilt cylinder 4, a side shift cylinder 5 or an auxiliary cylinder 10 may be installed in the working fluid line between the secondary consumer operating unit 41 and the secondary consumer 40. A safety circuit 62 for preventing freight from dropping due to an abrupt operation of the tilt cylinder when a tilt hose of the tilt cylinder 4 is damaged is preferably installed in the working fluid line connecting the tilt cylinder 4 and the hydraulic pump/motor 2. Reference numerals 31a and 31b of the drawings which are not described denote control valves used to control the corresponding cylinders of the secondary consumer 40 through the control levers (not shown).

Hereinafter, an operation of an energy reclaiming system for an electric forklift truck which is configured as described above will be described with reference to FIGS. 2 and 3.

If the control valve 31 of the lift cylinder operating unit 30 installed in the main control valve unit 20a is opened through control of the control lever 32 is opened, the working fluid is supplied to the lift cylinder 3 from the oil tank 7 through the hydraulic pump/motor 2 so that the working machine (or fork carriage) is raised by the lift cylinder 3. Then, since the flow amount limiting valve 22 of the working fluid return line 25a is interrupted, the working fluid of the lift cylinder 3 is not discharged unless a driver operates and opens the flow amount limiting valve 22.

Thereafter, if the driver opens the flow amount limiting valve 22 to lower the working machine, the working fluid in the lift cylinder 3 returns from the lift cylinder 3 to the two position valve 51 or 51a through the flow amount limiting valve 22. In this case, the two position valve 51 or 51a may be controlled by any one of the following two control methods.

First, a case of applying the exemplary embodiment in which the energy reclaiming unit 50 operates the two position valve 51 by using a difference between a return pilot pressure when the energy reclaiming unit 50 lowers the working machine and a supply pilot pressure during an operation of the secondary consumer 40 will be described. When a return pilot pressure when the working machine is lowered is smaller than a supply pilot pressure during an operation of the secondary consumer 40, the energy reclaiming unit 50 allows the second position valve 51 to move the first position for opening the passage of the working fluid to the oil tank 7 to reclaim the working fluid returning from the lift cylinder 3 to the oil tank 7. In contrast, when a return pilot pressure when the working machine is lowered is larger than a supply pilot pressure during an operation of the secondary consumer 40, the energy reclaiming unit 50 allows the second position valve 51 to move the second position for opening the passage of the working fluid to the hydraulic pump/motor 2 to supply the working fluid returning from the lift cylinder 3 to the hydraulic pump/motor 2.

Next, a case of applying a secondary exemplary embodiment in which the energy reclaiming unit 50 operates the two position valve 51a by using an electronic signal generated according to a magnitude of an operational displacement of the control lever 32 will be described. In the energy reclaiming unit 50, a preset operation signal is generated by the signal transmitter (not shown) according to a magnitude of an operational displacement of the control lever 32.

Thereafter, the controller 52 receives an operation signal differently generated by the signal transmitter according to a magnitude of an operational displacement of the control lever 32, and when determining that a return flow amount generated when the working machine is lowered is smaller than a flow amount consumed by the secondary consumer 40 (for example, the tilt cylinder 4, the side shift cylinder 5, the reach cylinder 6, or the auxiliary cylinder 10), the controller 52 converts the two position valve 51a to the first position for opening the passage to the oil tank 7 to reclaim the return flow amount to the oil tank 7.

In contrast, when determining that the return flow amount generated when the working machine is lowered is larger than a flow amount consumed by the secondary consumer 40 (for example, the tilt cylinder 4, the side shift cylinder 5, the reach cylinder 6, or the auxiliary cylinder 10), the controller 52 converts the two position valve 51a to the second position for opening the passage to the hydraulic pump/motor 2 to guide the return flow amount to the hydraulic pump/motor 2.

Then, the return flow amount supplied to the hydraulic pump/motor 2 is directly supplied to the secondary consumer 40 as the working fluid to be used to operate the secondary consumer or operate the hydraulic pump/motor 2 such that the return flow amount can be converted into electric energy. In this case, the electric energy charges the battery (not shown) of the electric forklift truck to be used to operate the electronic device 1 for operating the hydraulic pump/motor 2.

The present disclosure is not limited to the exemplary embodiments and the accompanying drawings, but it is apparent to those skilled in the art that the present disclosure can be simply replaced, modified and changed without departing from the spirit of the present disclosure.

| Description of Main Reference Numerals of Drawings | |
| --- | --- |
| 1: Electronic device | 2: Hydraulic pump/motor |
| 3: Lift cylinder | 7: Oil tank |
| 8, 57: Check valve | 20a: Main control valve unit |
| 25a: Working fluid return line | 22: Flow amount limiting unit |
| 30: Lift cylinder operating unit | 31: Control valve |
| 32: Control lever | 40: Secondary consumer |
| 41: Secondary consumer operating unit | |
| 50: Energy reclaiming unit | |

-continued

Description of Main Reference Numerals of Drawings

| | |
|---|---|
| 51, 51a: | Two position valve |
| 52: | Controller |
| 55: | Upstream working fluid return line |
| 55a: | First downstream working fluid return line |
| 55b: | Second downstream working fluid return line |
| 56: | Choke valve |

The invention claimed is:

1. An energy reclaiming system for an electric forklift truck, including an electronic device operated by a motor when a working machine is raised and operated by a generator when the working machine is lowered, a hydraulic pump/motor connected to the electronic device and configured to perform two functions of a hydraulic pump and a hydraulic motor, a main control valve unit including a lift cylinder operating unit connected to the hydraulic pump/motor and configured to operate a lift cylinder and a secondary consumer operating unit connected to the hydraulic pump/motor and configured to operate a secondary consumer, and a control lever including a control valve configured to control the lift cylinder or the secondary consumer through the lift cylinder operating unit and the secondary consumer operating unit of the main control valve unit, respectively, the energy reclaiming system comprising:

a working fluid return line provided with a flow amount limiting valve configured to interrupt a flow of a return flow amount generated by the lift cylinder when the working machine is lowered; and an energy reclaiming unit installed in the working fluid return line and configured to, if the return flow amount generated when the working machine is lowered is smaller than a flow amount consumed by the secondary consumer, reclaim the return flow amount to an oil tank, and, if the return flow amount generated when the working machine is lowered is larger than the flow amount consumed by the secondary consumer, guide the return flow amount to the hydraulic pump/motor;

wherein the energy reclaiming unit includes a hydraulically controlled two position valve installed in the working fluid return line and having a first position for, if a return pilot pressure when the working machine is lowered is smaller than a supply pilot pressure during an operation of the secondary consumer, opening a passage of the working fluid generated by the lift cylinder to the oil tank, and a second position for, if the return pilot pressure when the working machine is lowered is larger than the supply pilot pressure during an operation of the secondary consumer, opening the passage of the working fluid generated by the lift cylinder to the hydraulic pump/motor.

2. The energy reclaiming system of claim 1, further comprising:

a check valve installed in a downstream working fluid line of the hydraulic pump/motor such that the return flow amount passing through one of the two positions of the two position valve is guided to the hydraulic pump/motor without being leaked to the oil tank.

3. The energy reclaiming system of claim 1, wherein the working fluid return line includes an upstream working fluid return line provided with the flow amount limiting valve, a first downstream working fluid return line for guiding the return flow amount generated by the lift cylinder when the working machine is lowered from the two position valve to the oil tank, and a second downstream working fluid return line for guiding the return flow amount generated by the lift cylinder when the working machine is lowered from the two position valve to the hydraulic pump/motor.

4. The energy reclaiming system of claim 3, further comprising:

a choke valve installed in the first downstream working fluid return line to retard a lowering speed of the return flow amount returning from the two position valve to the oil tank; and a check valve one end of which is connected to the first downstream working fluid return line upstream of the choke valve and an opposite end of which is connected to the first downstream working fluid return line downstream of the choke valve, the check valve allowing a flow of the working fluid from the oil tank to an upstream side of the choke valve.

* * * * *